April 3, 1951 T. L. BARTHOLOMEW 2,547,248
ELECTRICAL MULTITESTER
Filed Oct. 10, 1946 3 Sheets-Sheet 1

Inventor
THOMAS L. BARTHOLOMEW.
By Howard J. Whelan.
Attorney

Inventor
THOMAS L. BARTHOLOMEW.
By Howard J. Whelan.
Attorney

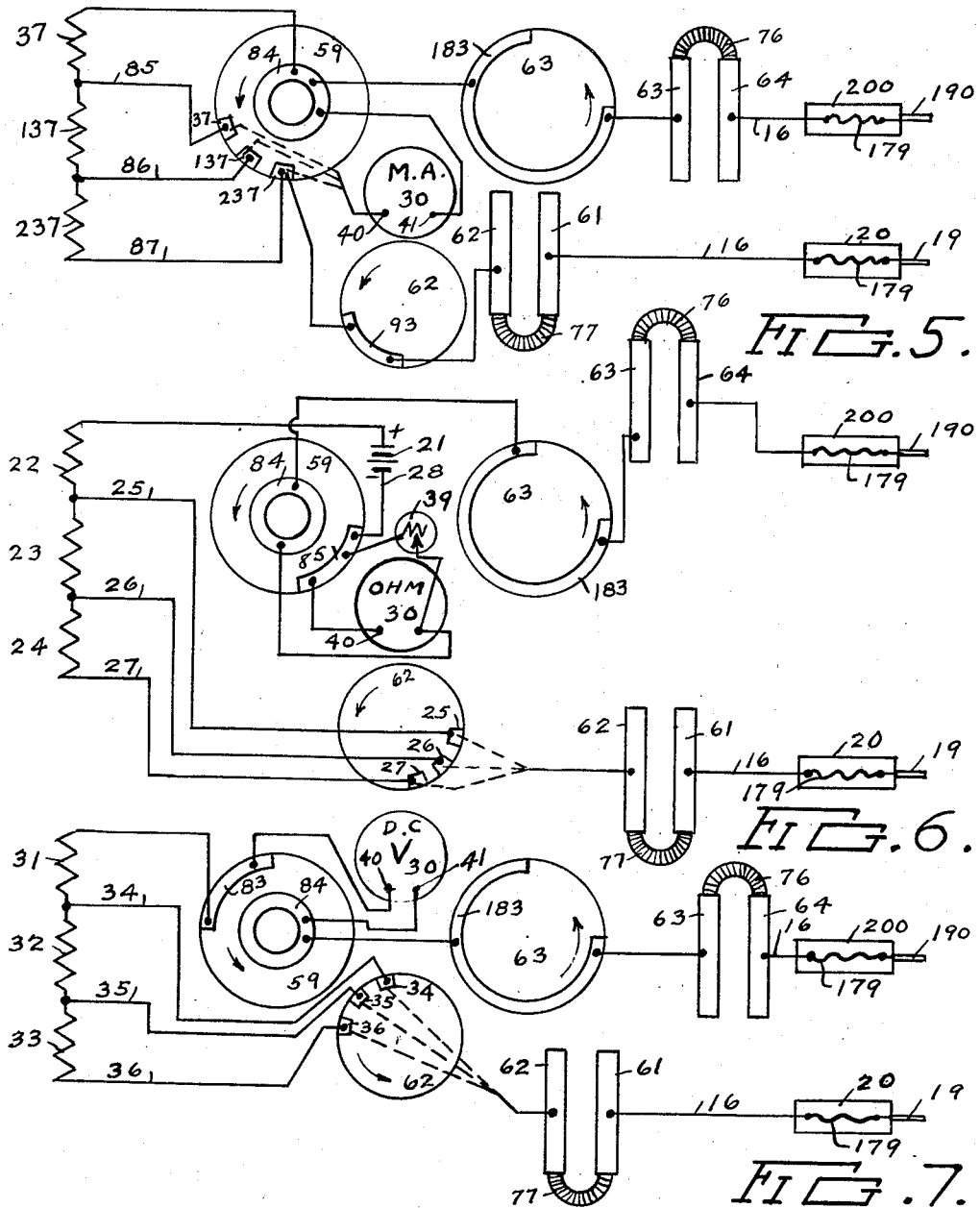

Patented Apr. 3, 1951

2,547,248

UNITED STATES PATENT OFFICE 2,547,248

ELECTRICAL MULTITESTER

Thomas L. Bartholomew, Baltimore, Md.

Application October 10, 1946, Serial No. 702,546

3 Claims. (Cl. 171—95)

1

This invention refers to testing equipment and more particularly to an electrical measuring device suitable for taking readings of direct current and alternate current voltage, amperage and ohmage of an extraneous network or the elements thereof in a single portable testing instrument.

It is an object of the present invention to provide a new and improved testing instrument that will avoid one or more of the disadvantages and limitations of the prior art.

Another object of this invention is to provide a new and improved testing instrument that not only will be portable but compact, easily read, convenient to use and attractive in appearance.

A further object of the invention is to provide a new and improved testing instrument that will embody various adjustments and conveniences that will facilitate its use for the purposes intended for it.

Other purposes will be appreciated as details of the principles of the invention and features of its construction are outlined.

For a better understanding of the invention and its objects, reference is made to the appended drawings and the description following, which together illustrate a particular form of the invention, while the scope of the invention is emphasized in the claims.

The drawings indicate the particular form of the invention as an example, and in the figures:

Figure 5 is a diagrammatic wiring diagram showing the connections used for reading M. A.;

Figure 6 is a diagrammatic wiring showing the connections used for reading ohms, and Figure 7 is a diagrammatic wiring diagram showing the connections used for reading D. C. voltage.

Similar reference numerals are used to designate the same elements in all the drawings.

Figure 1:
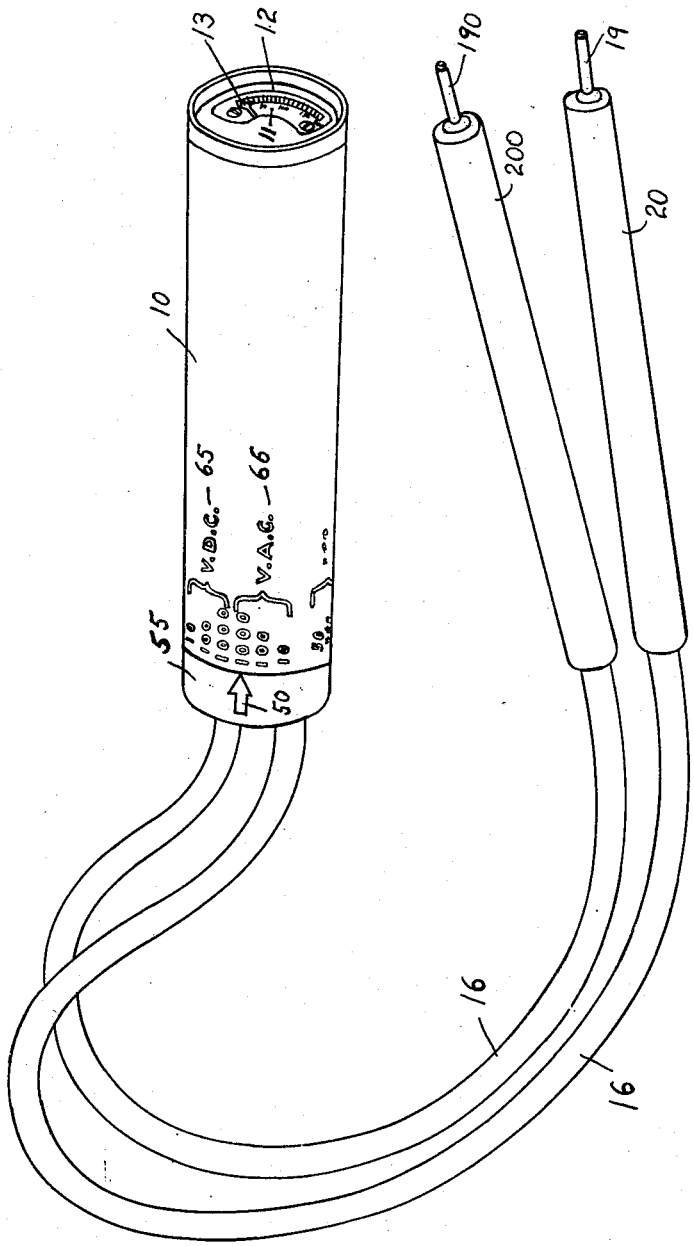
Figure 1 is a view in perspective of the tester, embodying this invention.
Figure 4:
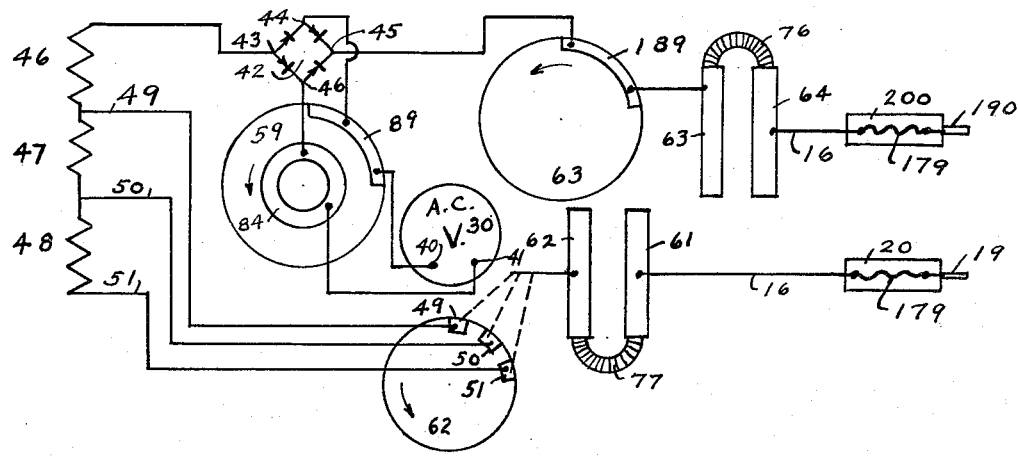
Figure 4 is a diagrammatic wiring diagram showing the connections used for reading A. C. voltage.

In the particular construction shown, a cylindrical housing 10 contains the operating elements within various chambers provided in its interior. A dial 11, with suitable meter indices or markings 12, and an oscillating needle 13, are provided at one end of the housing 10, and covered or protected by a window 14 of glass or plastic, transparent enough to permit easy inspection. This dial 11 and incidentals are limited in dimensions to the general diameter of the housing 10; a circular frame 15 serves to hold the window 14, and is screwed or fitted on the housing to come flush with its peripheral surface and is called the cap. A pair of flexible cables 16 extend from the opposite end of the housing, termed the bottom. These cables 16 contain stranded conductors which are coupled to the network within the housing 10. They pass through holes 17 in a plug 18 fitted in at this end, of the housing, and held in position by a circular frame 117. The cables 16 are made long enough to suit the use intended for them and to permit their facile manipulation. They terminate in long handles 20 and 200 of insulating material which have pointed prods 19 and 190 of conducting metal at their ends. These prods 19 and 190 are connected to fuse links 179 and are coupled to the cables 16 and are activated thereby to permit testing of the extraneous equipment brought forward for such purpose.

The interior structure of this particular device is adapted to measure the electrical energy or effects for four requirements. These are the direct current voltage of the circuit or the drop in E. M. F. across a part of a network; the current flowing in a network; the resistance of a network or portion thereof; and the voltage or current of an alternating current characteristic thereof. The details of the network are indicated diagrammatically in Figures 4, 5, 6 and 7. This network is structurally embodied in the housing 10 and the other parts previously referred to. A catalog of the parts includes a dry cell battery 21 of the flashlight type. In series with the positive side of a battery are ohmic resistances 22, 23 and 24, which are of a capacity to enable the meter to read 100 ohms; 10,000 ohms; and 100,000 ohms with contactors 25, 26 and 27 leading from them for connections to be made during the operation of the device in predetermined sequence. The negative side 28 of the battery 21 is left free to be closed at 40 on the meter 30 in various ways as the operation may require for the specific uses involved at the moment. Its main operative connection is intended to be made to the works of the meter 30 that operates the needle 13. The works include the general elements of a meter for measuring the electrical energy involved. A rheostat or potentiometer 39 also connects in the circuit and to the meter 30.

There is also a bridge rectifier 42 preferably of the electrolytic type having four terminals 43, 44, 45 and 46. Terminal 44 connects with contactor 89 mounted on ring 59 and passes to meter leg 40, through the meter and out the outer leg 41 to the contactor 84 to terminal 46. Terminal 45 connects with contactor 183 mounted on ring 63 and passes to ring 64 thence through the cable 16 and prod 190. The terminal 43 is in circuit with the 10 volt, 100 volt and 1000 volt resistances 46, 47 and 48 respectively which in turn are taped at 49, 50 and 51 and connect with contactors 49, 50 and 51 mounted on ring 62 and passes to ring 61 thence through the cable 16 and prod 19. These various parts or elements are likewise identified on the structure itself. However to hold the parts suitably in the housing 10, the meter 30 is firmly secured in the housing and contact is made therewith by the meter legs 50, and 53 which touch the terminals 83 and 84 respectively. The potentiometer 39 is assembled to a tubular cylinder 55 and is mounted on the plug 18 that fits in the housing 10 at the end opposite to the meter 30, and is controlled by the rotative handle 54 extending exteriorly therefrom. This cylinder 55 extends into the housing about half way and terminates with a disc-plate or ring 56 which is of a diameter sufficient to frictionally engage with the wall 57 about the chamber 58 formed in the housing. In conjunction with another similar plate or ring 59, and a series of studs 60 it forms a frame work and spacing for the battery 21 and to support the various resistances and rectifier 42 and other connections. The connections being arranged suitably therein to suit the networks used and where their terminals should be coupled to. including the meter legs 50 and 53. The cylinder 55 is surrounded peripherally by the ring 61 which is connected to prod 19. The ring 64 is connected to prod 190. The rings 61 and 62 connect with rings 61 and 64 respectively which are of conducting material and are within the wall 57 of the housing and the respective contact members. The rings 61, 62, 63 and 64 are spaced apart by collars 69, 70, 71 and 72 of varying widths positioned on the sleeve 67 of cylinder 55 to keep them separated at appropriate electrical distances. These collars and rings are fastened on the sleeve 67 securely so they become part of the cylinder 55 and interior elements as a unit. A groove 73 is provided in the collar 71 to serve as a lock when a set screw 74 is threaded through the housing wall 10 into it. Embedded in the housing wall 57 are connectors or contactors 77 and 76 that serve to close the network in certain predetermined parts when the cylinder is rotated within the housing to a predetermined position. A clicker 80 is operated by cylinder 55 whenever the cylinder is turned and passes an operating position in which the connections are registered properly for the particular tests to be made by it.

Figure 2:
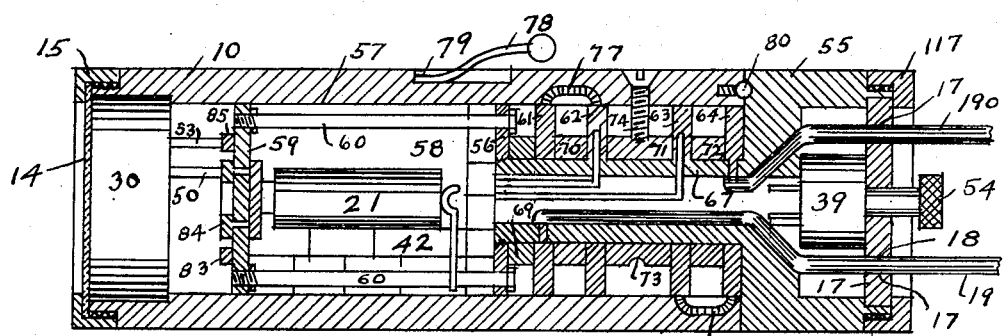
Figure 2 is a sectional view taken through the tester.
Figure 3:
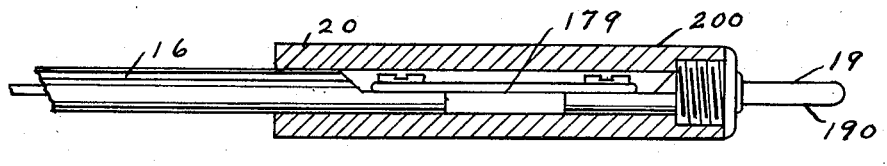
Figure 3 is a sectional view taken through the prods.

In the sections in Figure 2 are shown the manner in which the housing is arranged with the contactors and rings. A zero on the meter shows the position to which the needle 13 is pointed when no test is being made or the test is neutral.

In the operation of the device, the prods 19 and 190 are rested on the energized points of the equipment to be tested. If the test is for D. C. voltage, the cylinder 55 is rotated until the line of numerals 65 and 66 on the housing for the proper voltage aligns with the arrow 50 formed on the cylinder 55. This aligns the connections inside the housing for this particular test. The path of the current in the diagram will be either through resistors 31, 32 and 33 according to the voltage to be tested. If the voltage to be tested is known to be less than 10 volts, then the tap or contactor 34 is coupled to 31. The current will then flow through the network indicated in Figure 7 as follows. Through prod 19, to the conducting ring 61, thence through 77 to ring 62. Thence it passes to contactor 34, resistor 31, to contactor 83, then to meter 30, to contactor 84 to ring 183, on ring 63, through 76, to ring 64, then to cables and prod 190. The meter 30 will then indicate the values of the tested outside equipment coupled to it by the prods 19 and 190.

If the test is for ohms, the cylinder 55 is rotated until the line of numerals representing ohms on the housing for the proper ohmage align with the arrow 50 formed on the cylinder 55. This aligns the connections inside the housing for this particular test. The path of the current in the diagram will be either through the resistors 22, 23 and 24, according to the ohmage to be tested. If the ohms to be tested is known to be less than 100 ohms, then the tap or contactor 25 is coupled to 22. The current will then flow through the network indicated in Figure 6 as follows. Through prod 19, to the conducting ring 61, thence through 77 to ring 62. Thence it passes to contactor 25, resistor 22 to positive side of battery 21, then from the negative side of said battery to contactor 85, then to the meter leg 40, then to the rheostat 39 to meter leg 41, then to contactor 84 to ring 183 on the ring 63, through 76, to ring 64, then to cables and prod 190. The meter 30 will then indicate the values in ohms of the tested outside equipment coupled to it by the prods 19 and 190.

The current test is likewise shown in Figure 5. In this instance, the device is particularly adapted for small amperage. The cylinder 55 is turned until the arrow 50 aligns with the proximate amperage resistors 37, 137, or 237 to be utilized. The current then passes from the tested equipment through the prod 19 and consecutively follows through the parts 37 (or 137 or 237) to 84 on 59, to meter 30, to contactor 183, to ring 63, 76, ring 64 to prod 190.

For the A. C. test of voltage, the current passes through the prod 19, rings 61 and 62, connection 77, contactor ring 62 and selected contactors 49, 50, 51 through the selected resistors 46, 47 or 48 to the rectifier 42. Thence to contactor 84 to meter 30 to contactor 89, through rectifier 42, to rings 63 and 64 to prod 190.

The operator simply revolves the cylinder 55 of the device until the arrow 50 registers with the corresponding marking to be used for the test. This automatically arranges the elements within the housing to their proper alignment to produce the desired network, and enables the meter to give the readings desired when the prods 19 and 190 are applied appropriately.

The unit is compact and avoids the use of several pieces of equipment normally required in such tests although it is enabled to make many different kind of tests. It can be made relatively water proof, its elements are protected from mechanical injury by the housing. The handles 20 and 200, prods 19 and 190 and cables permit flexible coupling over considerable area. The elements may be removed as a whole for inspection, repair or adjustment in a facile manner. It is only necessary to remove the set screw 74 out of the groove 73 to allow such elements to be pulled out. The only part that is adjusted during operation is the potentiometer 39 and this is accomplished readily by turning the handle 54 placed very conveniently. The meter 30 can also be removed as it is held in by the screw threaded frame 15 that is readily detached, to permit access thereto.

The housing is provided with a suitable slot 79 in its peripheral wall, in which a clip 78 can be used removably for enabling the unit to be carried around in the pocket of the user.

While the construction shown in the drawings and described in the specifications indicates only one general structure, and is capable of making several distinct tests, it is not desired to limit the scope of the invention to that particular form as it is appreciated that other forms of constructions could be developed and used that would employ the same principles and come within the scope of the appended claims.

Having thus described the invention what is claimed is:

1. A combined electrical portable measuring apparatus for determining the values of A. C. voltage, current, resistance and D. C. voltage of electric circuits, comprising a cylindrical casing, an indicator dial and an indicating needle mounted at one end of the casing, a cylindrical sleeve rotatably secured at the opposite end of said casing, a pair of prods extending through and outwardly of said cylindrical sleeve, a plurality of electrical circuits within said cylindrical casing adapted to be selectively placed in circuit with said prods and indicating needle when the prods are used to determine the voltage, current and resistance to be measured, said circuits including a plurality of rotatable rings to selectively close and open the circuits, said cylindrical casing bearing outward indicia corresponding to current, voltage and resistance values, and connecting means between said cylindrical sleeve and said rings to selectively rotate said rings and close and open the aforesaid circuits, said sleeve bearing an outer symbol indicating the position of the sleeve with respect to the indicia on the cylindrical casing.

2. A combined electrical portable measuring apparatus as set forth in claim 1, a snap connection between said casing and said sleeve to yieldingly retain said sleeve in its position of adjustment.

3. A combined electrical portable measuring apparatus as set forth in claim 1 including a handle secured on said casing.

THOMAS L. BARTHOLOMEW.

REFERENCES CITED

The following references are of record in the file of this patent:

UNITED STATES PATENTS

| Number | Name | Date |
| --- | --- | --- |
| 454,270 | Herrick | June 16, 1891 |
| 1,593,024 | Macadie | July 20, 1926 |
| 1,606,063 | Edwards | Nov. 9, 1926 |
| 1,811,319 | Johnson | June 23, 1931 |
| 1,852,190 | Roe | Apr. 5, 1932 |
| 2,290,760 | Mehaffie | July 21, 1942 |
| 2,413,521 | Roskilly | Dec. 31, 1946 |

FOREIGN PATENTS

| Number | Country | Date |
| --- | --- | --- |
| 275,399 | Great Britain | Aug. 11, 1927 |
| 381,665 | Great Britain | Oct. 13, 1932 |